Feb. 13, 1962 G. B. STONE 3,020,944
POTATO FLAKE CUTTER
Filed Aug. 28, 1959
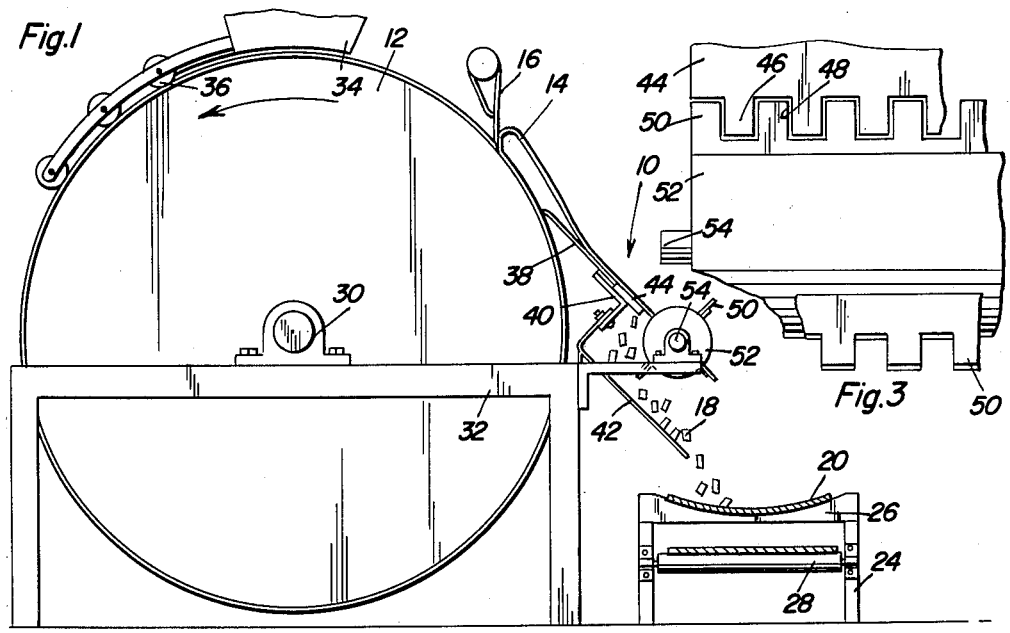
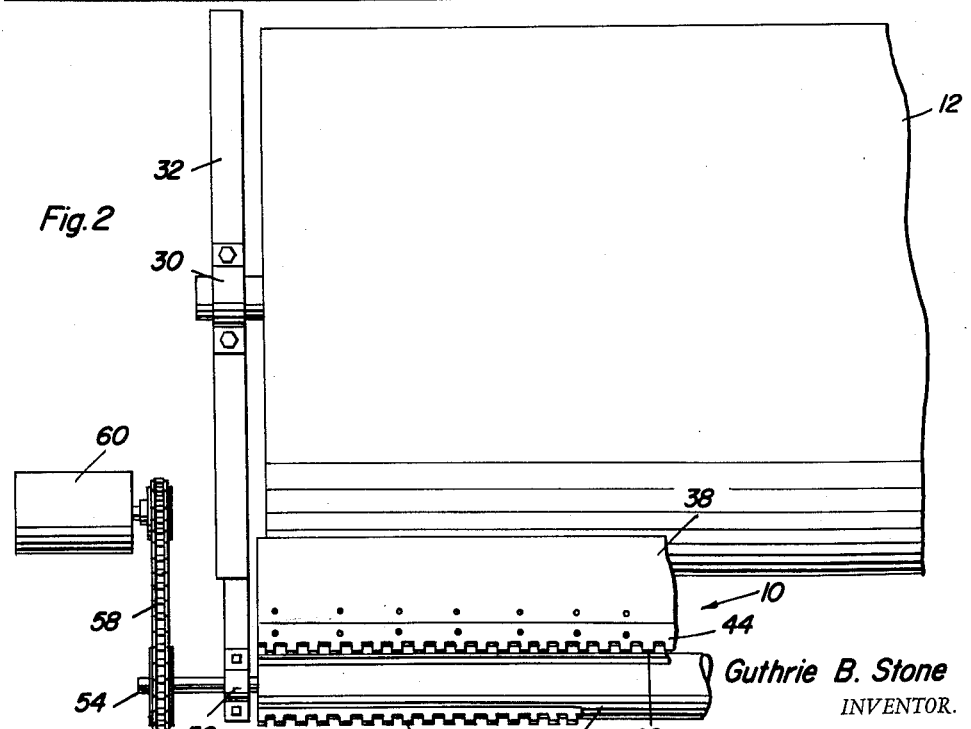
Guthrie B. Stone
INVENTOR.

United States Patent Office 3,020,944
Patented Feb. 13, 1962

3,020,944
POTATO FLAKE CUTTER
Guthrie B. Stone, % Stone Conveyor Co., Inc.,
Honeoye, N.Y.
Filed Aug. 28, 1959, Ser. No. 836,725
1 Claim. (Cl. 146—117)

The present invention generally relates to a cutting or breaking device primarily intended for use in cutting or breaking dehydrated potatoes into square flakes.

In recent developments, the food industry has developed dehydrated potatoes to a considerable degree and generally includes a drum drier for drying or dehydrating the potatoes in substantially a thin strip form after which the strip is peeled off of the drum and then the strip is cut into relatively small flakes so that they may be easily packaged with the ultimate consumer reconstituting the dehydrated potatoes in the usual manner. One of the major problems existing is the provision of a satisfactory cutter which will sever the peeled strip of dehydrated potatoes into the desired size flakes without causing any substantial amount of undesirable fines (broken particles). Therefore, it is the primary object of the present invention to provide a device for cutting the sheet or strip of dehydrated potatoes into flakes as it is peeled from the drum drier.

Another object of the present invention is to provide a cutter in which there is a master stationary knife and a rotatable drum carrying a plurality of knives or blades thereon which are so arranged in relation to the master knife that clearance is provided between the cutting surfaces thereby tending to break the sheet rather than cut it which reduces the quantity of fines produced and also eliminates the necessity of maintaining extremely fine adjustment of the cutters as would be necessary with shear type knives.

A further object of the present invention is to provide a potato flake cutter which is easy to maintain, easy to clean, simple in construction, efficient in operation and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an end elevational view of the potato flake cutter of the present invention with portions in section and illustrating the association of the cutter mechanism with the drum drier and discharge conveyor;

FIGURE 2 is a plan view of the construction of FIGURE 1 illustrating the drive mechanism for the rotary drum and blade mounted thereon; and FIGURE 3 is an enlarged fragmental plan view illustrating the relationship between the master blade and the rotatable drum with the radial blades thereon.

Referring now specifically to the drawings, the numeral 10 generally designates the potato flake cutter which is mounted adjacent to a cylindrical drum drier 12. The drum drier is generally 10 feet long and the dehydrated sheet 14 is peeled off of the drum drier by a peeling or removing knife 16 at the rate of 22 lineal feet per minute and it is the object of the cutter 10 to cut the sheet into a plurality of flakes 18 and then discharge the flakes onto a discharge conveyor belt 20 carried by a suitable supporting stand 24 with the load carrying portion of the conveyor belt 20 riding on generally concave support elements 26 and the lower run of the belt 20 riding on supporting rollers 28 for carrying the flakes to a desired location for packaging.

The drum 12 is mounted by suitable bearings 30 on a supporting framework 32 and is provided with a supply hopper 34 and a plurality of rollers 36 for spreading the material evenly on the surface of the drum 12 so that as the material proceeds around with the drum during rotation thereof, the material will be dried for subsequent removal by the removing or peeling knife 16.

The cutter 10 includes a feed chute or plate 38 extending to a position adjacent the periphery of the drum 12 but slightly spaced therefrom whereby the sheet of dehydrated potatoes will curl upwardly in relation to the peeling blade 16 and then reversely fold back onto the upper surface of the chute 38. The chute 38 is carried by an angle iron supporting member 40 which also supports a discharge chute or plate 42, which will discharge the flakes 18 onto the conveyor belt 20. The angle iron member 40 is supported in any suitable manner at the ends thereof or intermediate the ends thereof and may conveniently be attached to the frame 32 by any suitable means.

Mounted on the angle iron support member 40 is a stationary master blade or knife bar 44 having a plurality of longitudinally spaced projecting cutters 46 which define recesses 48 therebetween. The recesses 48 are adapted to receive radially projecting cutters 50 affixed to a rotatable drum 52 having the central shaft 54 thereof journalled in bearings 56 with the shaft 54 being driven by a sprocket chain 58 connected with a suitable motor 60.

The details of the drum form no part of the present invention except in its association with the cutter in that the mechanism for drying the potato mash on the drum may vary.

The product formed by the drum drier has certain critical factors which the above invention is compatible. For example, the flake in this process must be cut immediately upon being peeled from the drum drier or excessive fines may result as the drying continues rapidly as the flake is exposed to air of ambient temperature on the drum which may exceed 200° F. temporarily although this temperature will rapidly drop in relation to the radial distance from the drum. Thus, the cutter assembly is operated as close to the drum as possible.

Substantially the entire surface of the drum is utilized to dehydrate the potato so that the point where the flake is peeled off by the knife 16 is more or less fixed by the necessity of production requirements. From this point of peeling, the flake must drop by gravity and yet must not be too low to receive a conveyor underneath. The present invention does not employ feed rollers to assure proper size since feed rollers cannot be used on potato flakes as the flake is brittle and will not feed through the rolls.

Another factor which enters into the present invention is the construction of the drum of a normal 10 feet length thus requiring that the cutters be of equal length without there being any supporting bearings whatsoever. Thus, the weight of the rotating drum which carries the knives presents a considerable problem but with the particular construction shown, the weight thereof is minimized and will not have a tendency to deflect by its own weight and from cutting pressures.

The rotational speed of the cutting drum or knife is limited in its relation to the remainder of the structure. The present cutter drum having four or more cutting knives minimizes the speed required even while cutting flakes at the rate of 150,000 flakes ½ inch square per minute.

Due to the spacing between the cutting elements 50 on the drum 52, and the cutting element 46, there is more of a breaking action rather than a shearing action. The clearance between the knife cutters is approximately 3 to 4 times the thickness of the flake which is normally about .007 of an inch thick. The breaking or bending action in order to part the flakes results in less fine being produced than when the flake is sheared.

The drier the flake the higher the fine losses so the orientation of the cutter adjacent the drum eliminates excessive drying of the flake. Shearing also results in greater cellular breakdown of the product which is detrimental when the potatoes are reconstituted while the breaking action will result in less cell breakdown since the breaking action will occur between cells rather than shearing through cells. Also, the orientation of the guide chute, master blade and rotatable knife or blade is important inasmuch as the angle of approximately 45° from the horizontal on which the blades are placed will assure a gravity feed of the flake. The rotatable cutter is timed with the drum speed in order to cut the flake length correctly. A faster cutter speed with constant drum speed will result in a rectangular flake shape. For example, a variable speed control may be provided for cutting the flakes ¼ inch by ½ inch, ⅜ inch by ½ inch, ½ inch by ½ inch or the like assuming that the horizontal or transverse length is ½ inch. The smaller flakes while they are not necessarily more desirable will enable the manufacturer to put more flakes by weight into a given size container.

The use of four rows of cutters on the drum provides a dynamic balance for enabling the device to operate at high speeds. Also, the cutters are made from a one-piece construction and are actually notched out from a 10 foot strip of steel and they are not sharpened as a shear blade as only a breaking action takes place or is desired.

The foregoing is considered as illustrative only of the principles of the invention. Further, since numerous modifications and changes will readily occur to those skilled on the art, it is not desired to limit the invention to the exact construction and operation shown and described, and accordingly all suitable modifications and equivalents may be resorted to, falling within the scope of the invention as claimed.

What is claimed as new is as follows:

A rotary cutter comprising a cylindrical body having an axial bearing member, said body having at least one cutter member extending therefrom in a radial direction, said cutter having a plurality of projections with recesses therebetween constituting its cutting portion, and a stationary bar having complementary projections and recesses interfitting with said projections and recesses on said cutter, there being a small clearance between the interfitting portions of said cutter and said bar, whereby material acted upon by said rotary cutter will be broken instead of being sheared.

References Cited in the file of this patent

UNITED STATES PATENTS

| | | |
|---|---|---|
| 1,356,340 | Collis | Oct. 19, 1920 |
| 1,813,268 | Bachler | July 7, 1931 |
| 2,087,587 | Wendt | July 20, 1937 |
| 2,306,655 | Truax | Dec. 29, 1942 |
| 2,646,832 | Papendick | July 28, 1953 |
| 2,655,213 | Anderson | Oct. 13, 1953 |